United States Patent
Makela (10) Patent No.: US 7,765,184 B2
(45) Date of Patent: Jul. 27, 2010

(54) METADATA TRIGGERED NOTIFICATION FOR CONTENT SEARCHING

(75) Inventor: Kaj Makela, Tampere (FI)

(73) Assignee: Nokia Corporation, Espoo (FI)

( * ) Notice: Subject to any disclaimer, the term of this patent is extended or adjusted under 35 U.S.C. 154(b) by 356 days.

(21) Appl. No.: 11/232,842

(22) Filed: Sep. 22, 2005

(65) Prior Publication Data

US 2007/0067290 A1    Mar. 22, 2007

(51) Int. Cl.
*G06F 17/30* (2006.01)
(52) U.S. Cl. .............. 707/603; 707/608; 707/609; 707/791; 707/827
(58) Field of Classification Search .......... 707/600–831
See application file for complete search history.

(56) References Cited

U.S. PATENT DOCUMENTS

| 6,462,656 | B2 * | 10/2002 | Ulrich et al. ............. 340/539.1 |
| 6,895,401 | B2 * | 5/2005 | Skinner et al. ................. 707/1 |
| 2002/0198990 | A1 * | 12/2002 | Bradfield et al. ............ 709/224 |
| 2004/0117479 | A1 * | 6/2004 | Jellum et al. ................ 709/224 |
| 2004/0172593 | A1 | 9/2004 | Wong et al. |
| 2005/0041860 | A1 | 2/2005 | Jager |

* cited by examiner

*Primary Examiner*—Isaac M Woo
(74) *Attorney, Agent, or Firm*—Alston & Bird LLP (57) ABSTRACT

A method is provided for browsing a plurality of objects in search of one or more objects of interest, wherein a notification is triggered when a user focuses on, or otherwise activates or selects, an object having certain pre-defined metadata characteristics. A user device capable of enabling the user to search the plurality of objects using such a method is also provided, and a system and computer program product for searching a plurality of objects for one or more objects of interest are further provided.

39 Claims, 4 Drawing Sheets

METADATA TRIGGERED NOTIFICATION FOR CONTENT SEARCHING

FIELD OF THE INVENTION

Embodiments of the present invention relate to browsing objects, such as media objects, and more particularly to an improved means for locating objects of interest.

BACKGROUND OF THE INVENTION

The availability of media objects, such as pictures, photographs, videos, music files, text files, emails, and the like, has vastly increased over time. As a result, individuals are increasingly accessing, creating and/or storing large quantities of such media objects, as well as other types of objects, using their user devices (e.g., cellular telephones, personal digital assistants (PDAs), pagers, personal computers (PCs) or laptops, televisions, set-top boxes, cameras, camcorders, Global Positioning System (GPS) receivers, visual radio devices, music players, game consoles, video/audio players, etc.). Due to the limited size of the display screens on typical user devices, however, metadata associated with each object accessed, created and/or stored by a user cannot be displayed to the user at the same time as the object itself. Metadata, or data about data, is information about an object (e.g., a media object) or file that can be located separately from the object or as part of the object. Examples of different types of metadata include information about the developer of the object or the party transmitting the object (e.g., the party sending an email or text message), the time or date the object was created or transmitted, information on any modifications to the object, or information regarding the type of object.

Because of display screen size limitations, objects are typically presented to a user as thumbnails or with only a brief title string and/or date. In order for the user to view other metadata associated with the object, he or she is required, for example, to open a properties dialogue associated with the object. This limitation makes it difficult for a user to locate objects having certain specific qualities that the user is interested in. The ability to quickly and easily locate one or more objects of interest becomes especially beneficial to a user when one considers the increased volume of media, and other, objects available to the user for browsing. For example, the user may have hundreds of photographs either stored on his or her user device or accessible to the user device, and he or she may want to view only photographs that were taken in Venice, Italy or only photographs taken on a specific date. Currently the user would be forced to access each object (e.g., photograph) individually, open a properties dialogue for that object, and then, based on a manual investigation of the metadata displayed in the properties dialogue, determine whether the object meets the particular characteristics he or she is interested in. This can be very tedious and time consuming.

A need, therefore, exists for an improved method of browsing the volumes of objects, such as media objects, available to a user that enables the user to more quickly and easily locate one or more objects of particular interest to the user.

BRIEF SUMMARY OF THE INVENTION

Generally described, exemplary embodiments of the present invention provide an improvement over the known prior art by, among other things, providing a tool for locating objects of interest from among large quantities of objects using the metadata associated with the objects. More specifically, exemplary embodiments provide a method by which a user can browse through a plurality of objects, such as media objects, and be notified when a selected object meets various predefined characteristics. According to exemplary embodiments of the present invention a user is able to define one or more metadata watch rules, which define one or more metadata characteristics the user is interested in (e.g., location=Venice, Italy; date=Aug. 22, 2005). Once the metadata watch rules are defined, they are applied to each object (e.g., media object) selected by the user. In other words, the metadata of a selected object is read and compared to the predefined metadata characteristics of the metadata watch rules. When an object selected matches at least one of the metadata characteristics defined by the metadata watch rules, the user is notified, by way of, for example, a voice or text message, a graphic, a tone or other sound, or a vibration. Exemplary embodiments of the present invention, therefore, eliminate the need for a user to manually review the metadata associated with each object he or she is browsing. They further eliminate the need for metadata to be read for all objects at one time. In contrast, only the metadata of the selected object is read and compared to the predefined metadata characteristics of the metadata watch rules.

According to one aspect of the invention, a method of searching a plurality of objects for one or more objects of interest using a user device is provided. In one exemplary embodiment, the method includes: (1) providing one or more metadata watch rules, wherein the rules define one or more metadata characteristics of the objects of interest; (2) receiving a selection of an object from the plurality of objects, wherein the object selected has metadata associated with it; (3) applying the metadata watch rules to the object selected; and (4) triggering a notification where the metadata associated with the object selected matches at least one of the one or more metadata characteristics defined by the metadata watch rules.

In one exemplary embodiment, applying the metadata watch rules to the object selected involves first reading the metadata associated with the object selected, and then comparing the metadata read to the one or more metadata characteristics defined by the metadata watch rules. In another exemplary embodiment, the plurality of objects are media objects. The method of this embodiment may further include displaying a representation of respective media objects of the plurality on a display screen of the mobile device. In this embodiment, selecting the media object may include placing a cursor of the mobile device in close proximity to the representation of the media object on the display screen. Alternatively, selecting the media object may include touching the display screen in the vicinity of the representation of the media object using a pointer associated with the mobile device.

In one exemplary embodiment, the method further includes defining the notification triggered. The notification may comprise a sound, a graphic, a vibration, or a text or voice message, an audio or video clip, or a multimedia presentation.

According to another aspect of the invention, a user device is provided that is capable of being used to search a plurality of objects for one or more media of interest. In one exemplary embodiment, the user device includes: (1) a processor; and (4) a memory in communication with the processor that stores one or more metadata watch rules defined by a user associated with the user device. The metadata watch rules may define one or more metadata characteristics of the objects of interest. The memory may also store an application executable by the processor, wherein the application is capable, upon execution, of applying the metadata watch rules to a selected object.

The application may be further capable, upon execution, of triggering a notification where metadata associated with the object selected matches at least one of the one or more metadata characteristics defined by the metadata watch rules.

According to yet another aspect of the invention, a system for searching a plurality of objects for one or more objects of interest is provided. In one exemplary embodiment, the system includes: (1) means for providing one or more metadata watch rules which define one or more metadata characteristics of the objects of interest; (2) means for enabling selection of a object from the plurality of objects, the object selected having metadata associated with it; (3) means for applying the metadata watch rules to the object selected; and (4) means for triggering a notification where the metadata associated with the object selected matches at least one of the one or more metadata characteristics defined by the metadata watch rules.

According to another aspect of the invention a computer program product is provided for searching a plurality of objects for one or more objects of interest. The computer program product comprises at least one computer-readable storage medium having computer-readable program code portions stored therein. In one exemplary embodiment these computer-readable program code portions may include: (1) a first executable portion for providing a definition of one or more metadata watch rules which define one or more metadata characteristics of the objects of interest; (2) a second executable portion for enabling the selection of an object from the plurality of objects, the object selected having metadata associated with it; (3) a third executable portion for applying the metadata watch rules to the object selected; and (4) a fourth executable portion for triggering a notification where the metadata associated with the object selected matches at least one of the one or more metadata characteristics defined by the metadata watch rules.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview:

In general, as stated above, exemplary embodiments of the present invention provide a method of browsing objects wherein a notification is triggered when a user focuses on or detects an object meeting certain predefined characteristics. In particular, exemplary embodiments of the present invention enable a user to define one or more metadata characteristics he or she is particularly interested in looking out for (i.e., "metadata watch rules"). These characteristics may include, for example, where, on what date or at what time the object originated, from where or whom the object was obtained, what type of object it is, or what the content of the object includes. Once these metadata watch rules are defined, a user can browse objects stored on his or her device or accessible by the user device, for example, via the Internet, and if a user focuses on or selects an object possessing at least one of the predefined metadata characteristics, the user will be notified in some manner (e.g., by a text message stating that the object originated, for example, on Aug. 22, 2005, by a vibration, or by a tone or voice message). Additionally, one or more functions may be included in the metadata watch rules (e.g., to copy, transfer, send, store, delete, etc.) that can be executed when a match has been found. The objects browsed may include, for example, media files (e.g., images, audio files, videos or music files), messages, message logs and/or entries, text files, notes, web blogs, Internet links, presentations, icons, thumbnails, electronic program guides (EPGs), and/or their program information, electronic service guides (ESGs) and/or their service information, phone calls, phone call logs and/or their entries, radio frequency identification (RFID) tags, Wireless Local Area Network (WLAN) transmitters or gateways, or the like. The device used for browsing may include, for example, a cellular telephone, personal digital assistant (PDA), pager, personal computer (PC) or laptop, television, set-top box, set-to-box, camera, camcorder, GPS receiver, visual radio device, music player, game console or game terminal, video/audio player, cable or satellite receiver, or the like.

Figure 1:
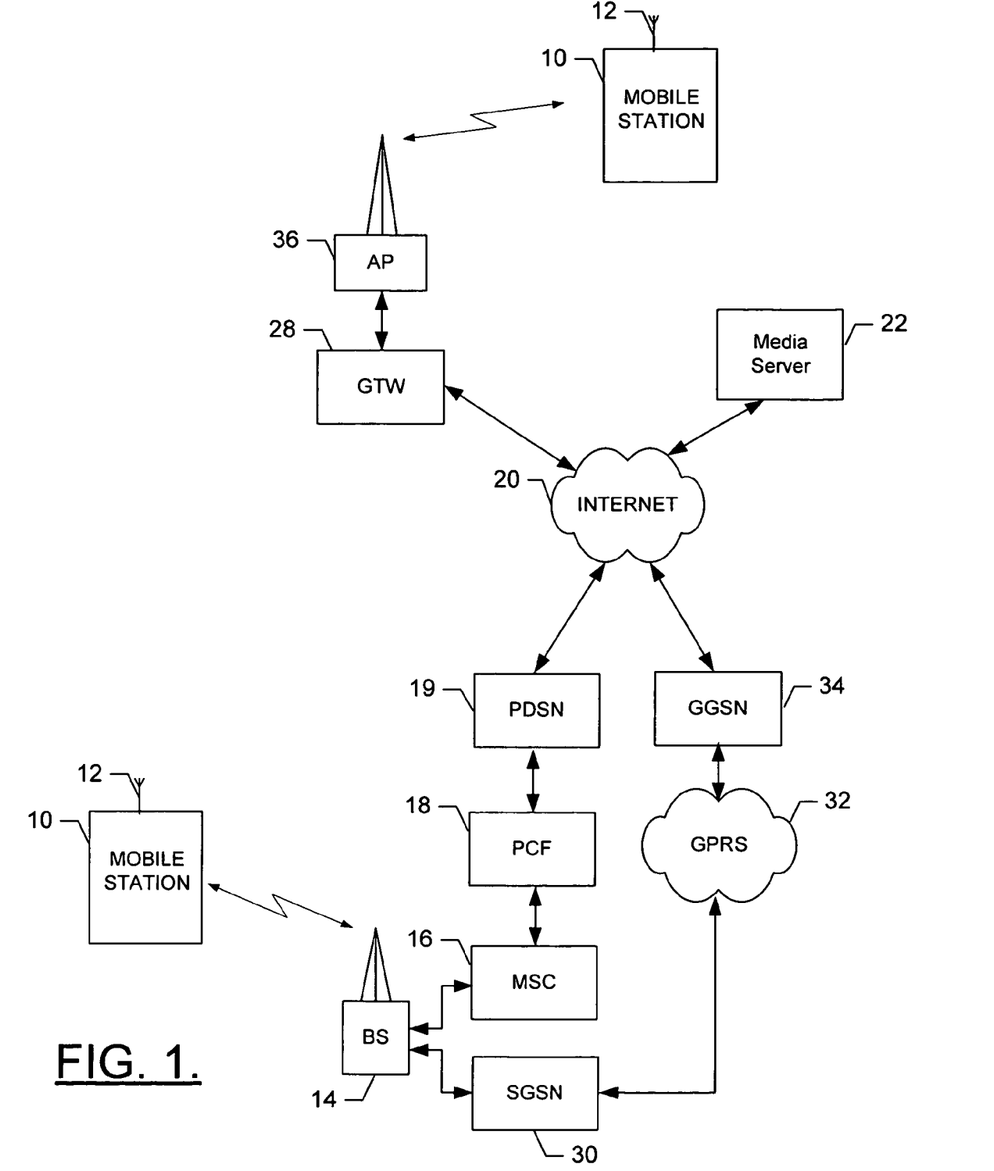
FIG. 1 is a block diagram of one type of system that would benefit from exemplary embodiments of the present invention.

Overall System and Mobile Device:

Referring to FIG. 1, an illustration of one type of system that would benefit from embodiments of the present invention is provided. The system can include one or more user devices 10, such as a mobile device, each having an antenna 12 for transmitting signals to and for receiving signals from one or more base stations (BS's) 14. The base station is a part of one or more cellular or mobile networks that each includes elements required to operate the network, such as one or more mobile switching centers (MSC) 16. As well known to those skilled in the art, the mobile network may also be referred to as a Base Station/MSC/Interworking function (BMI). In operation, the MSC is capable of routing calls, data or the like to and from user devices when those user devices are making and receiving calls, data or the like. The MSC can also provide a connection to landline trunks when user devices are involved in a call.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a Packet Control Function (PCF) 18, and the PCF is coupled to a Packet Data Serving Node (PDSN) 19, which is in turn coupled to a WAN, such as the Internet 20. In turn, devices such as processing elements (e.g., personal computers, server computers or the like) can be coupled to the user device 10 via the Internet. For example, the processing elements can include one or more processing elements associated with media server 22, which may be any corresponding node having an IP address which allows the user device 10 to communicate with it and from which the user device 10 may, for example, access or download media objects. As will be appreciated, the processing elements can comprise any of a number of processing devices, systems or the like capable of operating in accordance with embodiments of the present invention.

The BS 14 can also be coupled to a signaling GPRS (General Packet Radio Service) support node (SGSN) 30. As known to those skilled in the art, the SGSN is typically capable of performing functions similar to the MSC 16 for packet switched services. The SGSN, like the MSC, can be coupled to a data network, such as the Internet 20. The SGSN can be directly coupled to the data network. In a more typical embodiment, however, the SGSN is coupled to a packet-switched core network, such as a GPRS core network 32. The packet-switched core network is then coupled to another GTW, such as a GTW GPRS support node (GGSN) 34, and the GGSN is coupled to the Internet.

Although not every element of every possible network is shown and described herein, it should be appreciated that the user device 10 may be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. More particularly, one or more user devices may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS). network employing Wideband Code Division Multiple Access (WCDMA) radio access technology. Some narrowband AMPS (NAMPS), as well as TACS, network(s) may also benefit from embodiments of the present invention, as should dual or higher mode user devices (e.g., digital/analog or TDMA/CDMA/analog phones).

One or more user devices 10 (as well as one or more processing elements, although not shown as such in FIG. 1) can further be coupled to one or more wireless access points (APs) 36. The AP's can be configured to communicate with the user device in accordance with techniques such as, for example, radio frequency (RF), Bluetooth (BT), infrared (IrDA) or any of a number of different wireless networking techniques, including WLAN techniques. The APs may be coupled to the Internet 20. Like with the MSC 16, the AP's can be directly coupled to the Internet. In one embodiment, however, the APs are indirectly coupled to the Internet via a GTW 28. As will be appreciated, by directly or indirectly connecting the user devices and the processing elements (e.g., media server 22) and/or any of a number of other devices to the Internet, whether via the AP's or the mobile network(s), the user devices and processing elements can communicate with one another to thereby carry out various functions of the respective entities, such as to transmit and/or receive data, content or the like. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the user devices 10 to the media server 22 across the Internet 20, one or more such entities may be directly coupled to one another. As such, one or more network entities may communicate with one another in accordance with, for example, RF, BT, IrDA or any of a number of different wireline or wireless communication techniques, including LAN and/or WLAN techniques. Further, the user device 10 and media server 22 can be coupled to one or more electronic devices, such as printers, digital projectors and/or other multimedia capturing, producing and/or storing devices (e.g., other terminals).

Figure 2:
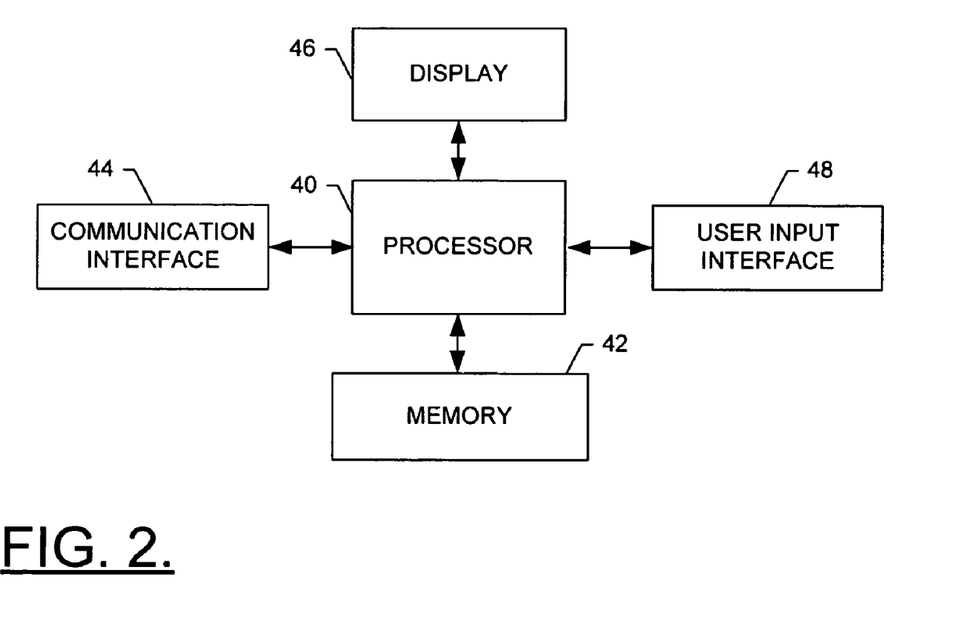
FIG. 2 is a schematic block diagram of an entity capable of operating as a user device, media server or other network entity, in accordance with exemplary embodiments of the present invention.

Referring now to FIG. 2, a block diagram of an entity capable of operating as a user device 10 and/or media server 22 is shown in accordance with one embodiment of the present invention. The entity capable of operating as a user device and/or media server includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. As shown, the entity capable of operating as a user device 10 and/or media server 22 can generally include means, such as a processor 40 connected to a memory 42, for performing or controlling the various functions of the entity. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention.

In addition to the memory 42, the processor 40 can also be connected to at least one interface or other means for displaying, transmitting and/or receiving data, content or the like. In this regard, the interface(s) can include at least one communication interface 44 or other means for transmitting and/or receiving data, content or the like, as well as at least one user interface that can include a display 46 and/or a user input interface 48. The user input interface, in turn, can comprise any of a number of devices allowing the entity to receive data from a user, such as a keypad, a touch display, a touch pad, a joystick, a mouse or other input device.

Figure 3:
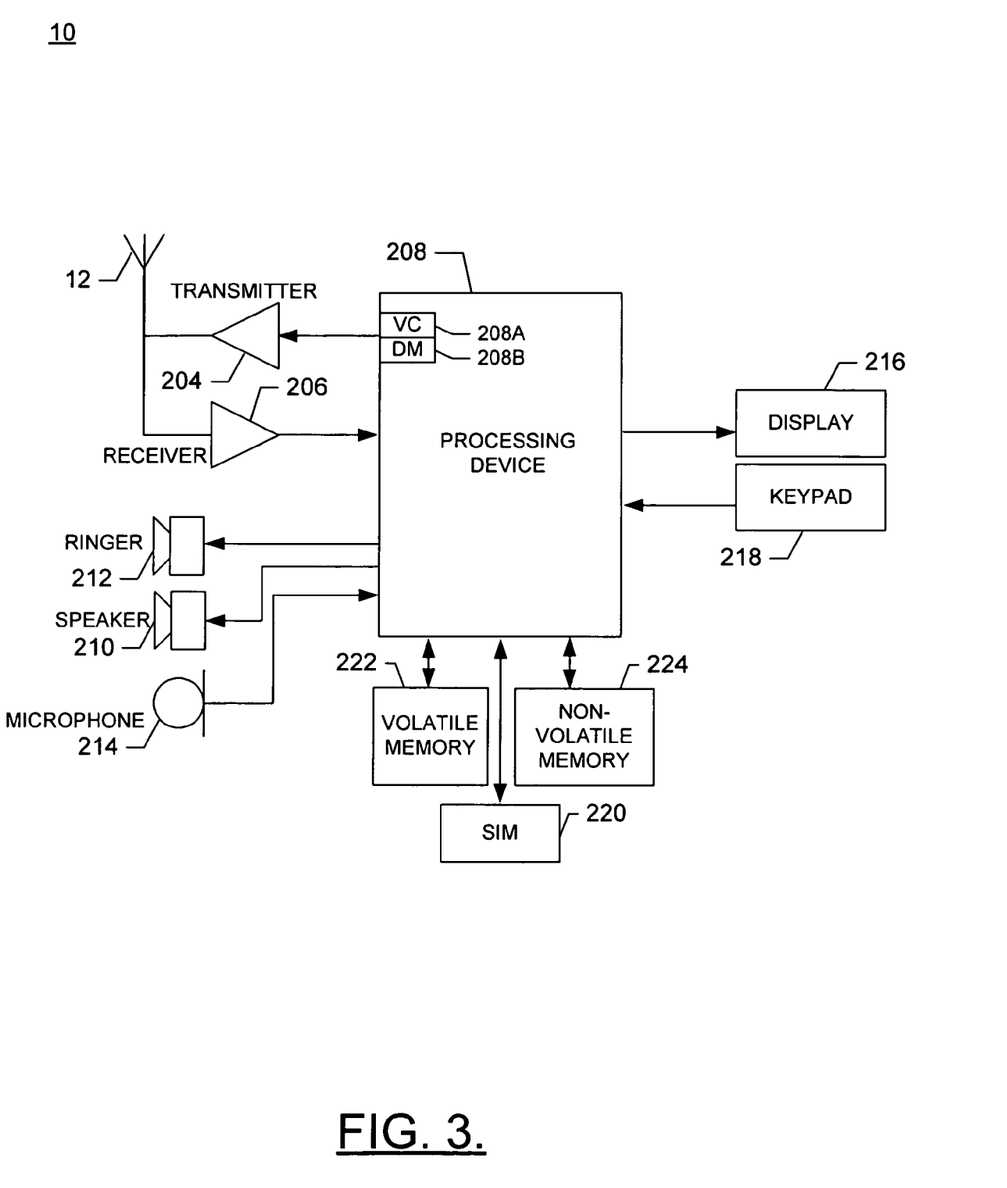
FIG. 3 is a schematic block diagram of a user device capable of operating in accordance with an exemplary embodiment of the present invention.

Reference is now made to FIG. 3, which illustrates one type of user device 10 that would benefit from embodiments of the present invention. It should be understood, however, that the user device illustrated and hereinafter described is merely illustrative of one type of user device that would benefit from the present invention and, therefore, should not be taken to limit the scope of the present invention. While several embodiments of the user device are illustrated and will be hereinafter described for purposes of example, other types of user devices, such as mobile devices, mobile phones, mobile communications devices personal digital assistants (PDAs), pagers, personal computers (PCs) or laptop computers, cameras, camcorders, video/audio devices, music players, television devices, GPS devices, watches, and other types of electronic systems in any combination including both mobile, wireless devices and fixed, wireline devices, or devices without network connections, can readily employ embodiments of the present invention.

The user device includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 3, in addition to an antenna 12, the user device 10 includes a transmitter 204, a receiver 206, and means, such as a processing device 208, e.g., a processor, controller or the like, that provides signals to and receives signals from the transmitter 204 and receiver 206, respectively. These signals include signaling information in accordance with the air interface standard of the applicable cellular system and also user speech and/or user generated. data. In this regard, the user device can be capable of operating with one or more air interface standards, communication protocols, modulation types, and access types. More particularly, the user device can be capable of operating in accordance with any of a number of second-generation (2G), 2.5G and/or third-generation (3G) communication protocols or the like. Further, for example, the user device can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 208, such as a processor, controller or other computing device, includes the circuitry required for implementing the video, audio, and logic functions of the user device and is capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the user device are allocated between these devices according to their respective capabilities. The processing device 208 thus also includes the functionality to convolutionally encode and interleave message and data prior to modulation and transmission. The processing device can additionally include an internal voice coder (VC) 208A, and may include an internal data modem (DM) 208B. Further, the processing device 208 may include the functionality to operate one or more software applications, which may be stored in memory. For example, the controller may be capable of operating a connectivity program, such as a conventional Web browser. The connectivity program may then allow the user device to transmit and receive Web content, such as according to HTTP and/or the Wireless Application Protocol (WAP), for example.

The user device may also comprise means such as a user interface including, for example, a conventional earphone or speaker 210, a ringer 212, a microphone 214, a display 216, all of which are coupled to the controller 208. The user input interface, which allows the user device to receive data, can comprise any of a number of devices allowing the user device to receive data, such as a keypad 218, a touch display (not shown), a microphone 214, or other input device. In embodiments including a keypad, the keypad can include the conventional numeric (0-9) and related keys (#, *), and other keys used for operating the user device and may include a full set of alphanumeric keys or set of keys that may be activated to provide a full set of alphanumeric keys. Although not shown, the user device may include a battery, such as a vibrating battery pack, for powering the various circuits that are required to operate the mobile station, as well as optionally providing mechanical vibration as a detectable output.

The user device can also include means, such as memory including, for example, a subscriber identity module (SIM) 220, a removable user identity module (R-UIM) (not shown), or the like, which typically stores information elements related to a mobile subscriber. In addition to the SIM, the user device can include other memory. In this regard, the user device can include volatile memory 222, as well as other non-volatile memory 224, which can be embedded and/or may be removable. For example, the other non-volatile memory may be embedded or removable multimedia memory cards (MMCs), Memory Sticks as manufactured by Sony Corporation, EEPROM, flash memory, hard disk, or the like. The memory can store any of a number of pieces or amount of information and data used by the user device to implement the functions of the user device. For example, the memory can store an identifier, such as an international mobile equipment identification (IMEI) code, international mobile subscriber identification (IMSI) code, user device integrated services digital network (MSISDN) code, or the like, capable of uniquely identifying the user device. The memory can also store content. The memory may, for example, store computer program code for an application and other computer programs. For example, in one embodiment of the present invention, the memory may store computer program code for applying one or more metadata watch rules defined by a user associated with the user device and stored, for example, on the user device, to an object selected by the user using the user device. The memory may further store computer program code for triggering a notification to the user where the metadata associated with the object selected matches at least one of the metadata characteristics defined by the metadata watch rules. Further, the user device 10 may comprise a radio frequency (RF) scanner, such as an RFID reader, a camera for capturing images and/or video and reading bar codes, a TV receiver for receiving digital TV transmission, such as DVB, DVB-T, DVB-S, DVB-H, DBM (digital multimedia broadcast), Media FLO, etc.

The system, method, user device and computer program product of exemplary embodiments of the present invention are primarily described in conjunction with mobile communications applications. It should be understood, however, that the system, method, user device and computer program product of embodiments of the present invention can be utilized in conjunction with a variety of other applications, both in the mobile communications industries and outside of the mobile communications industries. For example, the system, method, user device and computer program product of exemplary embodiments of the present invention can be utilized in conjunction with wireline and/or wireless network (e.g., Internet) applications.

Figure 4:
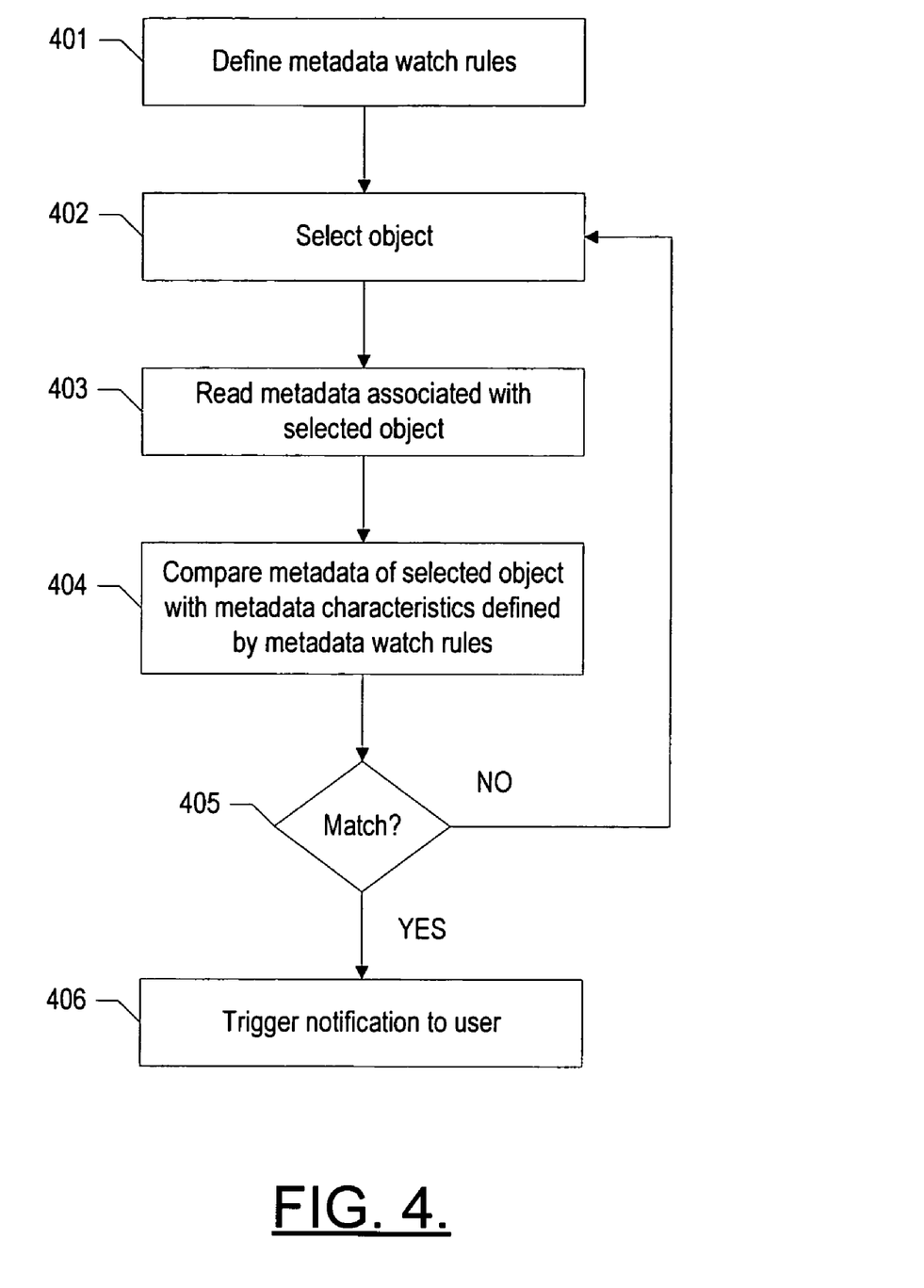
FIG. 4 is a flow chart illustrating the steps which may be taken when browsing objects in accordance with exemplary embodiments of the present invention.

Metadata Triggered Notification:

Reference is now made to FIG. 4, which illustrates the steps which may be taken when attempting to locate one or more objects (e.g., media objects) of interest in accordance with exemplary embodiments of the present invention. As shown, the process begins at Step 401 when a user defines one or more metadata watch rules, which can be stored on the user device or in a network entity (e.g., a media server or database) accessible by the user device and provided, for example, to a comparison application (discussed below) for comparing to the metadata of a selected object. The metadata watch rules define characteristics of the objects the user would like to locate from among the plurality of objects the user is browsing. In particular, each metadata watch rule defines one or more metadata characteristics (which are not readily visible to the user when browsing the objects using his or her device, for example because of the reduced size of a typical user device display screen) the user is interested in watching out for. For example, a metadata watch rule may be in the form of "metadata field LOCATION=Venice, Italy," and/or "metadata field TIMESTAMP=Aug. 22, 2005." According to these examples, the user may be interested in finding objects, such as photographs or images, taken in or of Venice, Italy and/or on Aug. 22, 2005.

Other metadata characteristics of interest may include, for example, the creator of the object, the originating device of the object, a content descriptor, information regarding the context of the object, people in the object, validity of the object, keywords describing the object, or a unique ID of the object. The metadata watch rule may include any number of metadata characteristics and in any combination. For example, the user may specify that he or she wants to find objects with characteristics A and B, but not C, or either (A and B) or (C and D), etc. Exemplary embodiments of the present invention are not limited to any number or combination of metadata characteristics.

In one exemplary embodiment the user device includes means, such as a query tool application, for providing a definition of the metadata watch rules. In one exemplary embodiment the query tool provides the user with metadata input fields in which the user may input keywords. For example, continuing the example above, the application may include metadata input fields corresponding to the LOCATION and/or TIMESTAMP metadata fields, in which the user may input, Venice, Italy and Aug. 22, 2005, respectively. In an alternative exemplary embodiment the user may be prompted to input a normal descriptive sentence (e.g., "I would like to find all photographs taken in Venice, Italy"), and the query tool may then be capable of converting the descriptive sentence into keywords for the applicable metadata fields.

In yet another alternative embodiment, the query tool may be configured to enable the user to drag and drop one or more preferred (or not-preferred) objects into a file corresponding to the metadata watch rule. The metadata associated with each object in the file can then be read and analyzed to determine what characteristics are shared by each object in the file. Based on the characteristics shared, the query tool can then input keywords into the metadata input fields in a manner similar to that discussed above. For example, where the user wants to look for photographs taken in Venice, the user may drag and drop several photographs he or she knows were taken in Venice into the metadata watch rule file. The query tool can then read the metadata associated with each photograph dropped in the file in order to determine that at least one of the characteristics shared by the photographs is that they were taken in Venice. Based on this determination, the query tool may place keyword Venice in the LOCATION metadata input field. If the metadata also indicated that the photographs had been taken on the same day, the common date may have also been placed in the TIMESTAMP metadata input field. The user may similarly indicate that the characteristic(s) shared by the objects in the file are characteristic(s) the user is not interested in locating. In this exemplary embodiment, the query tool may then place, for example, a "NOT Venice," or "~Venice" keyword into the LOCATION metadata input field.

In one exemplary embodiment, the query tool application is embodied by software stored in memory and executed by the processing device 208 of the user device 10. As will be understood by those of ordinary skill in the art, exemplary embodiments of the present invention are not limited to any one means for providing the metadata watch rules, such as for enabling the user to define metadata watch rules discussed above. In contrast, the other means not described herein, involving all hardware, all software or some combination thereof, may further be used to provide the metadata watch rules without departing from the spirit and scope of exemplary embodiments of the invention.

In another exemplary embodiment of the present invention, the metadata watch rules may be created, modified or removed automatically as a result of the occurrence of a certain event or circumstance or based on the context of the user or user device. In other words, the user device may comprise means for using contextual information regarding the user and/or the user device (e.g., information about the location of the user, what the user has scheduled for the day, who the user is scheduled to meet, etc.) to make assumptions regarding the needs of the user and create rules based on those assumptions. For example, an application operating on the user device may detect that the user is at a dog show. This could be based on, for example, a GPS receiver located in the user device, or simply by a calendar entry indicating that the user is to attend the dog show. Based on this context awareness, the application may assume that the user is interested in viewing photographs of dogs or from the same dog show last year. Based on this assumption, the application may create a metadata watch rule that defines those characteristics (i.e., content of photograph includes dogs and/or photograph taken at location of dog show on the date of the previous dog show). In this manner, the application may use information that was meant for other applications (i.e., information not specifically input by the user for the purpose of defining metadata watch rules) to make implicit assumptions about the context of the user and to automatically create, modify or remove metadata watch rules.

In yet another exemplary embodiment, the metadata watch rules may be provided by any third party or service provider via any network connection. The metadata watch rules may be downloaded to and stored in the user device for further usage. In addition, the metadata watch rules may have a predefined validity period after which the rules may be deleted or inactivated.

In one exemplary embodiment, Step 401 further includes enabling the user to define the type of notification and/or method of notifying the user when an object meeting the metadata watch rule is selected by the user. This is discussed in detail below with regard to Step 406.

Once the metadata watch rules have been defined and stored, the user is ready to begin browsing objects, such as media objects. Exemplary embodiments of the present invention apply to any object accessed by a user using his or her user device, regardless of where the object is stored or how the object is accessed. For example, the objects browsed may be stored on the user device. Alternatively (or in addition), they may be stored on a network entity, such as a media server, accessible by the user device, or on a removable medium, such as a memory card, disc, or cassette. The user may download the objects from the network (e.g., via the Internet), or he or she may receive the object via an email, Short Message Service (SMS) or Multimedia Messaging (NMS) message, or rich text format file.

In Step 402 the user selects an object. In one exemplary embodiment, where a user is browsing media objects using his or her laptop or cellular telephone, selecting the media object may include placing a cursor on top of or in the vicinity of an image, such as a thumbnail image, representing the media object on the laptop or cellular telephone display screen. The browsing or selecting may occur in any user interface or in any software application, such as a file manager, media file editor, file presentation program, Internet browser, email program, phone catalogue, calendar, diary, ESG, or the like. One example of a media file presentation program is Nokia Lifeblog®. Alternatively, where the user is browsing media objects using his or her PDA, selecting the media object may include using a pointer associated with the PDA to touch a representation of the media object displayed on the PDA display screen. In one exemplary embodiment, a gaze/eye movement-based selection or pointing method may be used for the selection step. This embodiment may be used, for example, in augmented reality applications used with head-worn displays.

In yet another exemplary embodiment, selecting an email, SMS or MMS message (i.e., the email or message constitutes the selected object) may also constitute selecting the media object contained in or attached to the email, SMS or MMS message. In this example, metadata of the message itself, such as information about the sender or the sender's device, and/or metadata of the attached media object may be read (Step 403, below). In still another exemplary embodiment, answering an incoming phone call may constitute selecting the object. In this example, the call can be considered a real-time media/audio stream having metadata, such as information about the caller, the caller ID or the caller's device, associated with it.

In other exemplary embodiments, selecting the object may include using an RF scanner, such as an RFID reader, to read an RF transmitter (e.g., RFID tags), or a camera to scan bar codes or other unique identifiers, displayed on, for example, an object, a bag, box, container, or other storage item containing the object, or on an advertisement. In this exemplary embodiment, the metadata is stored in the RFID tag or bar code. In yet another exemplary embodiment, selection may be done by a Bluetooth or WLAN module that is used to monitor other Bluetooth or WLAN nodes, modules, access points, gateways or user devices. In this exemplary embodiment, the metadata describes the nodes, modules, access points, gateways, etc., and is read by Bluetooth or WLAN modules.

When an object is selected, the metadata associated with that object is read (Step 403). In one exemplary embodiment, the user device includes means, such as a reading tool application, for reading the metadata of the selected item. In one exemplary embodiment, the reading tool application is embodied by software stored in memory and executed by the processing device 208 of the user device 10. Alternatively, the reading tool and its application may be embodied in the RFID reader, bar code reader, or camera. As will be understood by those of skill in the art, other means, including hardware, software or some combination thereof, may further be used without departing from the spirit and scope of exemplary embodiments of the present invention.

The metadata read in Step 403 can now be compared to the metadata characteristics defined in the metadata watch rules (Step 404), and it can be determined whether or not there is a match (Step 405). In one exemplary embodiment, the user device includes means, such as a comparison application, for comparing the metadata with the metadata watch rules. Typically, the comparison application is embodied by software stored in memory and executed by the processing device 208 of the user device 10. Continuing with the example from above, Steps 404 and 405 may involve querying the LOCATION field of the metadata associated with the selected object to determine whether or not it includes the keyword Venice. Alternatively, or in addition, it may include querying the TIMESTAMP field in the metadata read to determine whether or not it includes the date Aug. 22, 2005.

As will be understood by those of ordinary skill in the relevant art, metadata attributes may vary in the type, value (e.g., binary or classifying (ordered and not ordered)), or quantity used. The step of determining whether or not the metadata read matches the defined metadata characteristics may, therefore, differ depending upon the type, value or quantity of metadata read. As a result, in one exemplary embodiment, a metadata vector may be calculated based on the comparison of the metadata in the object and the metadata watch rule, and a threshold value may be defined that indicates at what point the metadata attributes match. For example, the comparison application may specify that where the match (i.e., the comparison of the metadata in the object and the metadata watch rule) is, e.g., >0.8, there is in fact a match. Other methods may similarly be used without departing from the spirit and scope of the exemplary embodiments of the present invention.

As a practical example, consider the scenario where the user indicates that he or she would like to locate objects, such as photographs, taken in or of Venice Italy. In one exemplary embodiment, the metadata watch rule may include the latitude and longitude coordinates for the center of downtown Venice. Alternatively, they may include a range of latitude and longitude coordinates, which would include all of Venice. Assuming the former, where a photograph is taken at, or is of, some location within Venice, but not at the center of downtown, the metadata indicating the location of the photograph may not directly match the metadata of the watch rule. Assuming the latter, some analysis would have to be done to determine whether the coordinates indicated in the metadata of the photograph are within the range given in the watch rule. In general, therefore, as will be understood by those of ordinary skill in the art, the term "match" as used herein does not require that there be a one-to-one exact correlation between the metadata read and the metadata characteristics of the watch rules. In exemplary embodiments, some analysis or calculation may be necessary when performing this step of the process.

Where the metadata associated with the object selected matches at least one of the metadata characteristics defined by the metadata watch rules (i.e., where the object selected possesses at least one of the characteristics the user is searching for) a notification is provided to the user (Step 406). The notification may be in the form of a sound (e.g., a voice message stating that the object was, for example, taken in Venice, or a beep or other tone), a text message, a graphic, or any combination thereof. Alternatively, the notification triggered may include a video or presentation consisting of multiple media types, e.g., a hypertext markup language (HTML) document, a synchronized multimedia integration language (SMIL) or a smiley presentation, or flash animation. In one exemplary embodiment the notification may be in the form of a call or a message sent to the user or to some other third party, such as a service provider. The form of the notification may depend upon certain contextual information. For example, where the user is participating in an ongoing call using his or her user device when the notification is triggered, the notification may consist of a vibration or a text message, rather than a tone or voice message, which might disrupt the conversation. The notification may be provided to the user via the user device itself, or it may be communicated via a network to some other system, device and/or user. As stated above, the user may have defined the type of notification and/or method of notifying the user in Step 401 when he or she defined the metadata watch rules. Alternatively, the notification content and/or information regarding how the notification should be implemented may be included in the object itself.

In one exemplary embodiment, the user device comprises means, such as a notification tool application, for triggering a notification where the metadata associated with the media object selected matches at least one of the metadata characteristics defined by the metadata watch rules, and means, such as display, audio and communication applications/drivers for actually creating the notification. Typically, the notification tool application is embodied by software stored in memory and executed by the processing device 208 of the user device 10. As will be understood by those of ordinary skill in the art, any similar means comprising all hardware, all software, or some combination of the two, may be used to implement this step without straying from the spirit and scope of exemplary embodiments of the present invention.

Where there is not a match between the metadata associated with the media object selected and at least one of the metadata characteristics defined by the metadata watch rules, the process returns to Step 402 where the user selects another object and the preceding steps are repeated for the newly selected object.

As described above, therefore, exemplary embodiments of the present invention provide a tool for notifying a user when he or she has selected (i.e., focused on or activated) an object possessing certain characteristics the user is specifically watching out for. Exemplary embodiments of the present invention overcome the limitations created by the display screen size of typical user devices to provide a quick and easy way to locate one or more objects of interest from among a large volume of objects either stored on or accessible by the user device.

CONCLUSION

As described above and as will be appreciated by one skilled in the art, embodiments of the present invention may be configured as a system, method, mobile terminal device or other apparatus. Accordingly, embodiments of the present invention, including those including the query tool application, the reading tool application, the comparison application and/or the notification tool application, may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Exemplary embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   providing one or more metadata watch rules, said rules defining one or more metadata characteristics of one or more media objects of interest among a plurality of media objects stored on one or more memories;
   receiving, from a user associated with a user device, a selection of a media object from the plurality of media objects, said media object having metadata associated with said media object;
   reading, in response to receiving the selection, the metadata associated with the media object selected; and
   comparing, using an appropriately configured processor, the read metadata associated with the media object selected to the one or more metadata characteristics defined by the metadata watch rules; and
   triggering a notification where the metadata associated with the media object selected matches at least one of the one or more metadata characteristics defined by the metadata watch rules.

2. The method of claim 1, wherein the media object selected comprises a picture, photograph, video, music file, text file, or email.

3. The method of claim 2, wherein at least one of the one or more memories on which the plurality of media objects is stored is embodied on the user device.

4. The method of claim 1, wherein the user device comprises a mobile device.

5. The method of claim 1, wherein at least one of the plurality of media objects is accessible by the user device via a communications network.

6. The method of claim 1, wherein providing one or more metadata watch rules comprises creating the metadata watch rules based on information provided by the user associated with the user device.

7. The method of claim 1, wherein providing one or more metadata watch rules comprises automatically creating the metadata watch rules based on contextual information related to the user device.

8. The method of claim 7, wherein the contextual information related to the user device comprises one or more of a location of the user associated with the user device, an event the user associated with the user device has scheduled, or a person the user associated with the user device is scheduled to meet.

9. The method of claim 1 further comprising:
displaying a representation of respective media objects of the plurality on a display screen of the user device.

10. The method of claim 9, wherein receiving the selection of the media object comprises receiving an indication of a cursor of the user device being placed on top of or in close proximity to the representation of the media object on the display screen.

11. The method of claim 9, wherein receiving the selection of the media object comprises detecting a tactile input on the display screen in the vicinity or on top of the representation of the media object.

12. The method of claim 1, wherein receiving a selection of a media object comprises receiving a message.

13. The method of claim 12, wherein reading the metadata associated with the media object selected comprises reading metadata indicating a sender of the message.

14. The method of claim 1, wherein receiving a selection of a media object comprises receiving an incoming phone call.

15. The method of claim 14, wherein reading the metadata associated with the media object selected comprises reading metadata indicating a caller associated with the incoming phone call.

16. The method of claim 1, wherein receiving a selection of a media object comprises enabling the user to scan a unique identifier corresponding with the media object.

17. The method of claim 1, wherein receiving a selection of a media object comprises enabling a user to use a radio frequency (RF) scanner associated with the user device to find an RF transmitter in the media object.

18. The method of claim 1, wherein receiving a selection of a media object comprises enabling a user to use a radio frequency identification (RFID) reader associated with the user device to read an RFID tag in the media object.

19. The method of claim 1 further comprising:
permitting definition of the notification to be triggered.

20. The method of claim 1, wherein the notification is selected from a group consisting of a sound, a text message, a graphic, a vibration, a voice message, an audio clip, a video clip and a multimedia presentation.

21. The method of claim 1, wherein the one or more metadata characteristics defined by the metadata watch rules comprise one or more of a location associated with a media object of interest, a time associated with a media object of interest, a creator of a media object of interest, an originating device of a media object of interest, or a person in an object of interest.

22. An apparatus comprising a processor and a memory having computer program instructions stored thereon, wherein the instructions when executed by the processor cause the apparatus or another apparatus to at least:

receive, from a user associated with the apparatus, a selection of a media object from a plurality of media objects stored on one or more of the memory or one or more other memories, said media object having metadata associated with said media object;

apply, in response to receiving the selection, one or more metadata watch rules to the selected media object, said one or more metadata watch rules defining one or more characteristics of one or more media objects of interest among the plurality of media objects, by comparing the metadata associated with the selected media object to the one or more metadata characteristics defined by the metadata watch rules; and trigger a notification where metadata associated with the selected media object matches at least one of the one or more metadata characteristics defined by the metadata watch rules.

23. The apparatus of claim 22, wherein the media object selected comprises a picture, photograph, video, music file, text file, or email.

24. The apparatus of claim 22, wherein the instructions when executed by the processor further cause the apparatus or the another apparatus to enable the one or more metadata watch rules to be defined.

25. The apparatus of claim 22, wherein the instructions when executed by the processor further cause the apparatus or the another apparatus to automatically create the one or more metadata watch rules based on contextual information related to the apparatus.

26. The apparatus of claim 22 further comprising:
a radio frequency (RF) scanner, wherein in order to receive a selection of the media object, the instructions when executed by the processor further cause the apparatus or the another apparatus to enable use of the RF scanner to find an RF transmitter in the media object.

27. The apparatus of claim 22 further comprising:
a radio frequency identification (RFID) reader, wherein in order to receive a selection of the media object, the instructions when executed by the processor further cause the apparatus or the another apparatus to enable use of the RFID reader to read an RFID tag in the media object.

28. The apparatus of claim 22 further comprising a display screen, wherein in order to receive a selection of a media object, the instructions when executed by the processor further cause the apparatus or the another apparatus to display a representation of respective media objects of the plurality on the display screen, said representations capable of being selected by the user of the apparatus.

29. The apparatus of claim 22, wherein in order to apply the metadata watch rules to the media object selected, the instructions when executed by the processor further cause the apparatus or the another apparatus to read the metadata associated with the selected media object and compare the metadata read to the one or more metadata characteristics defined by the one or more metadata watch rules.

30. The apparatus of claim 22, wherein the instructions when executed by the processor further cause the apparatus or the another apparatus to enable definition of the notification to be triggered.

31. The apparatus of claim 22, wherein at least one of the plurality of media objects is stored in a database accessible by the apparatus.

32. An apparatus comprising:
means for providing one or more metadata watch rules, said rules defining one or more metadata characteristics of one or more media objects of interest among a plurality of media objects stored on one or more memories;

means for receiving, from a user associated with the apparatus, a selection of a media object from the plurality of media objects, said media object having metadata associated with said media object;

means for reading, in response to receiving the selection, the metadata associated with the media object selected;

means for comparing the read metadata associated with the media object selected to the one or more metadata characteristics defined by the metadata watch rules; and means for triggering a notification where the metadata associated with the media object selected matches at least one of the one or more metadata characteristics defined by the metadata watch rules.

33. The apparatus of claim 32, wherein the media object selected comprises a picture, photograph, video, music file, text file, or email.

34. The apparatus of claim 32 further comprising:
means for storing the one or more metadata watch rules.

35. The apparatus of claim 32 further comprising:
means for displaying a representation of respective media objects of the plurality to the user, wherein the means for receiving a selection of a media object further comprises means for receiving a selection of a representation of the media object.

36. A computer program product, wherein the computer program product comprises at least one computer-readable storage medium having computer-readable program code portions stored therein, the computer-readable program code portions comprising:

a program code portion for providing one or more metadata watch rules, said rules defining one or more metadata characteristics of one or more media objects of interest among a plurality of media objects stored on one or more memories;

a program code portion for causing a selection of a media object from the plurality of media objects to be received from a user associated with an apparatus, said media object selected having metadata associated with said media object;

a program code portion for reading, in response to receiving the selection, the metadata associated with the media object selected;

a program code portion for comparing the read metadata associated with the media object selected to the one or more metadata characteristics defined by the metadata watch rules; and a program code portion for triggering a notification where the metadata associated with the media object selected matches at least one of the one or more metadata characteristics defined by the metadata watch rules.

37. The computer program product of claim 36, wherein a media object comprises a picture, photograph, video, music file, text file, or email.

38. The computer program product of claim 36 further comprising:

a program code portion for displaying a representation of respective media objects, wherein the second executable portion program code portion for causing a selection of a media object to be received includes instructions for causing the selection to be received by causing a selection of a representation of the media object to be received.

39. The computer program product of claim 36, wherein the notification triggered is selected from a group consisting of a sound, a text message, a graphic, a vibration, a voice message, an audio clip, a video clip and a multimedia presentation.

* * * * *